United States Patent
Lonari et al.

(10) Patent No.: US 12,524,312 B1
(45) Date of Patent: Jan. 13, 2026

(54) PROVIDING DEDUPLICATION FILESYSTEM OPERATIONS TO A BACKUP UTILITY NATIVE TO AN APPLICATION

(71) Applicant: Dell Products L.P., Round Rock, TX (US)

(72) Inventors: Vishal Kailasrao Lonari, Pune (IN); Vikas Jagannath Chaudhary, Pune (IN); Aditi Tejas Gosavi, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/769,361

(22) Filed: Jul. 10, 2024

(51) Int. Cl.
*G06F 11/14* (2006.01)
*G06F 9/54* (2006.01)
*G06F 16/174* (2019.01)

(52) U.S. Cl.
CPC ............ *G06F 11/1453* (2013.01); *G06F 9/54* (2013.01); *G06F 16/1748* (2019.01); *G06F 2201/80* (2013.01)

(58) Field of Classification Search
CPC ..... G06F 11/1453; G06F 16/1748; G06F 9/54
See application file for complete search history.

(56) References Cited

U.S. PATENT DOCUMENTS

| | | | |
|---|---|---|---|
| 2017/0031830 A1* | 2/2017 | Bk | G06F 3/0604 |
| 2021/0200567 A1* | 7/2021 | Tsirkin | G06F 12/0246 |
| 2021/0255771 A1* | 8/2021 | Kilaru | G06F 3/0659 |
| 2022/0075544 A1* | 3/2022 | Gupta | G06F 11/1453 |

FOREIGN PATENT DOCUMENTS

WO WO-2024120633 A1 * 6/2024

* cited by examiner

*Primary Examiner* — Tarek Chbouki
(74) *Attorney, Agent, or Firm* — Staniford Tomita LLP

(57) ABSTRACT

A system call of a Filesystem in Userspace (FUSE) library at a client is mapped to first and second operations of a deduplication filesystem, the system call performing an in-kernel copy between source and destination file descriptors. A filesystem mount point of the deduplication filesystem is presented to an application residing at the client. Upon the application triggering the system call on the mount point, the system call is intercepted. First and second parameters of the system call are examined. The first parameter indicates an offset location in the source file descriptor at which a range of data to copy should start. The second parameter indicates an offset location in the destination file descriptor at which the range of data copied should be inserted. Based on the examination, one of a first or second API of a client-side library residing at the client is called.

15 Claims, 9 Drawing Sheets

PROVIDING DEDUPLICATION FILESYSTEM OPERATIONS TO A BACKUP UTILITY NATIVE TO AN APPLICATION

TECHNICAL FIELD

The present invention relates generally to information processing systems, and more particularly to making operations of a deduplication filesystem available to applications having their own backup utilities.

BACKGROUND

A deduplication filesystem is a type of filesystem that seeks to reduce the amount of redundant data that is stored. Generally, data that is determined to already exist on the storage system is not again stored. Instead, metadata including references is generated to point to the already stored data and allow for reconstruction. Using a deduplication filesystem can dramatically reduce storage costs. As such, deduplication filesystems can be especially attractive to store and manage backups of client applications.

A client application may include a backup utility that is native to the application being backed up. A user of the application is likely to prefer using the native backup utility of the application to conduct backups, rather than some other third-party backup software, because the user already has familiarity with the application. The backup utility may also offer features unique to the application being backed up that may not be available when using other third-party backup software. It is desirable to provide data protection operations of the deduplication filesystem to the backup utility of the application without having to rely on other third-party backup software or software development kits (SDKs).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A system call of a Filesystem in Userspace (FUSE) library at a client is mapped to first and second operations of a deduplication filesystem, the system call performing an in-kernel copy between source and destination file descriptors. A filesystem mount point of the deduplication filesystem is presented to an application residing at the client. Upon the application triggering the system call on the mount point, the system call is intercepted. First and second parameters of the system call are examined. The first parameter indicates an offset location in the source file descriptor at which a range of data to copy should start. The second parameter indicates an offset location in the destination file descriptor at which the range of data copied should be inserted. Based on the examination, one of a first or second API of a client-side library residing at the client is called.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
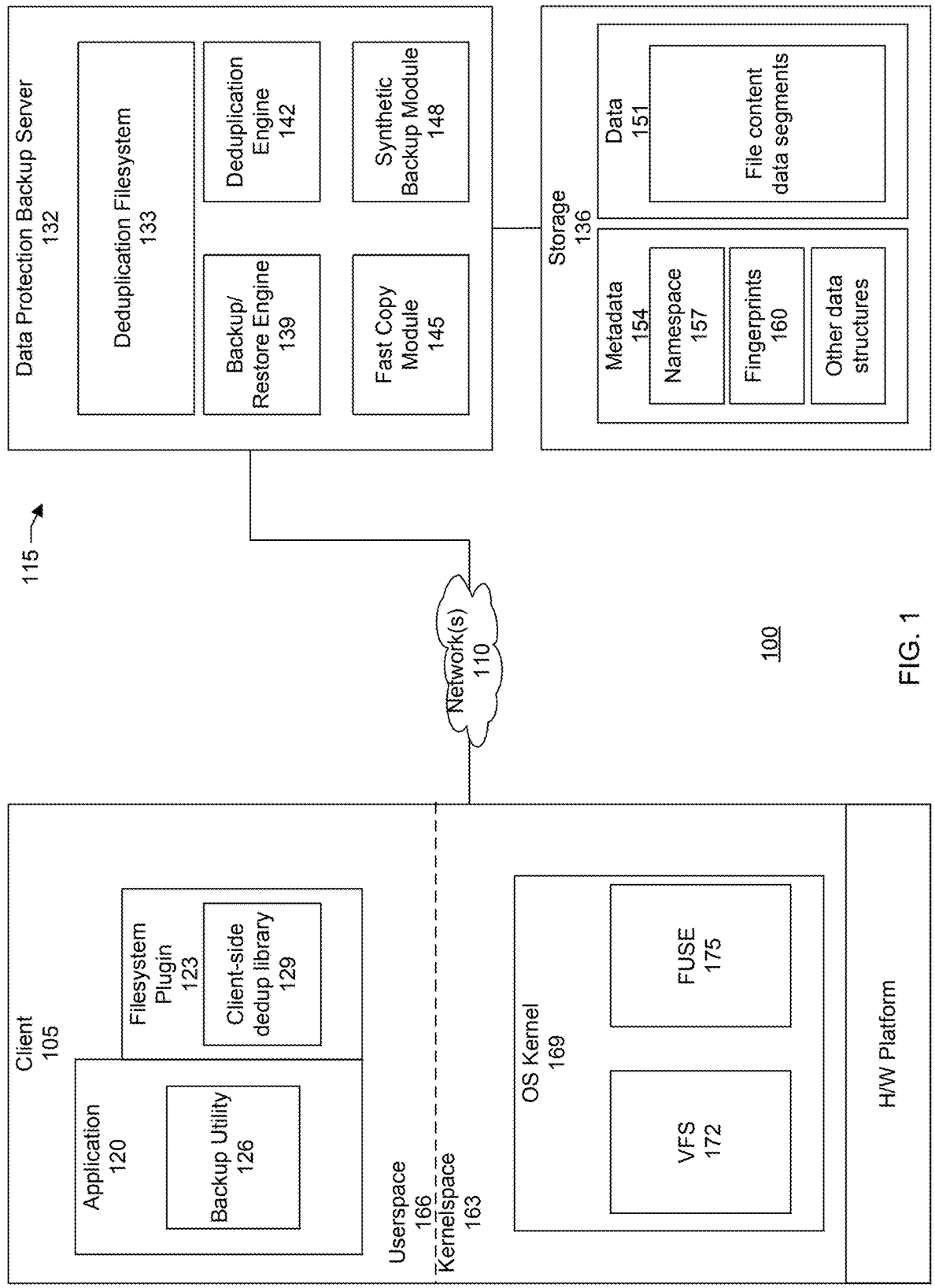
FIG. 1 shows a block diagram of an information processing system within which deduplication filesystem operations may be provided to a backup utility of an application being backed up, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a block diagram of an information processing system 100 within which systems and techniques are implemented to allow a backup utility, native to an application being backed up, to take advantage of data protection operations offered by a deduplication data protection backup storage system. Operations or features of the deduplication storage system are made directly available to the application (or backup utility of the application) without the need to rely on or integrate a software development kit (SDK) or third-party applications, plugins, and libraries such as an OpenStorage Technology (OST) library. In an embodiment, the operations include fast copy and synthetic backup operations.

As shown in the example of FIG. 1, a client 105 is connected via a network 110 to a deduplication backup storage system 115. The backup storage system may be remote from the client and may provide data protection to multiple clients. The client includes an application 120 and a filesystem plugin 123 residing at the client. In an embodiment, the client includes a Unix system. The application includes a backup utility 126 that is native to the application. The filesystem plugin includes a client-side deduplication library 129.

The deduplication backup storage system includes a data protection backup server 132 having a deduplication filesystem 133. A storage system 136 is connected to the data protection server. The deduplication filesystem includes components such as a backup and restoration engine 139, deduplication engine 142, fast copy module 145, and synthetic backup module 148. Storage includes data 151 and metadata 154. Data includes user-generated content. Metadata may include a namespace 157 and fingerprints 160, among other data structures.

The filesystem organizes the files and other data stored in the storage system and presents that data in a logical format to the clients and applications. Data may be organized into files and folders into which the files may be stored. When a client requests access to a file, the filesystem issues a file handle or other identifier for the file to the client. The client can use the file handle or other identifier in subsequent operations involving the file. A namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

In an embodiment, the filesystem is a deduplicated filesystem. An example of a deduplicated filesystem includes a Data Domain File System (DDFS) as provided by Dell Technologies of Round Rock, Texas. Deduplication involves splitting a file to be written to the storage system into a set of segments, comparing fingerprints of the segments against fingerprints corresponding to segments that have previously already been stored and are present at the storage system, and generating metadata references that allow the file to be reassembled. Segments of the file having matching fingerprints are considered redundant and do not have to be again stored. Segments of the file that do not have matching fingerprints are considered new and are stored.

The backup and deduplication engine is responsible for managing the backup and deduplication of files or other user data from the clients to the backup storage system connected to the backup server. The backup storage system may be referred to as a secondary storage system with the client storage system being a primary storage system. The backed up files stored in secondary storage may be stored in a format that is different from a native format of the primary file copies at the clients. For example, backups may be stored in a compressed format, deduplicated format, or both.

Figure 2:
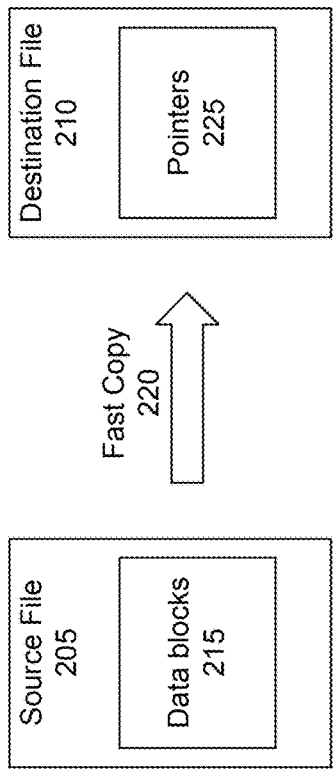
FIG. 2 shows an example of a fast copy operation, according to one or more embodiments.

FIG. 2 shows a block diagram of an operation of the fast copy module. The fast copy module is responsible for conducting a referenced-based copy of a file that has been backed up to the backup storage system. In a referenced-based or fast copy operation, metadata of a source file is copied to a destination, but not actual file data or content. The fast copy operation can be used to clone files on the backup storage system to an alternate location within the local instance of the deduplication filesystem. A fast copy can be used to make referenced-based copies of files and directory trees of a source directory to a target directory in the deduplication filesystem.

The example shown in FIG. 2 includes a source file 205 and destination file 210. The source file includes actual data blocks or file content 215. A fast copy operation 220 is a metadata copy operation where the destination includes pointers 225 to the data blocks or content of the source file. In an embodiment, when an attempt is made to access the destination file, the blocks or content sought to be accessed is retrieved from the source file. Any writes to the destination file may be maintained in a separate file associated with the destination file.

Performing a referenced-based copy or fast copy of a file is much faster than reading actual file content from the source and writing the actual file content to the destination file as the operation is limited to the manipulation and copying of file metadata and no content data is read/written to disk. The fast copy operation is very quick as the operation only copies file metadata and no file data are read or written to the disks. Furthermore, files created by the fast copy operation de-duplicate perfectly against existing data on disk.

Figure 3:
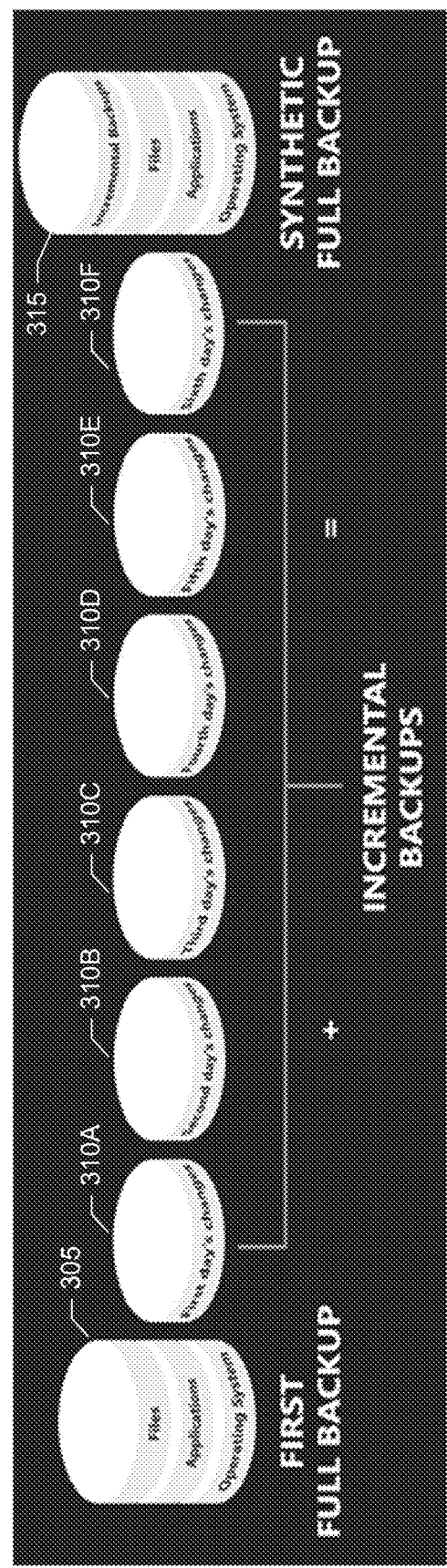
FIG. 3 shows an example of a synthetic backup operation, according to one or more embodiments.

FIG. 3 shows a block diagram of an operation of the synthetic backup module. The example shown in FIG. 3 includes an initial or first full backup 305. The first full backup may include files, applications, and operating system data. After the first full backup there can be any number of incremental backups 310A-F to capture changes made after the full backup. Synthetic backup is the process where multiple backup images residing at the backup storage system are stitched together to create a full backup image. Such a backup image may be referred to as a synthetic full backup 315. Stitching is carried out by 'including' regions of the base file into the destination file based on the known offset values. This involves copying file metadata and not the actual data. A synthetic full backup may thus include a full backup and one or more incremental backups. Synthetic backups may be used to combine or consolidate previous full and incremental backups. The synthetic backup operation is handled by the backup server and secondary storage repository and thus does not place undo loads on client or network resources. Synthetic backups help to conserve storage space and can reduce the time required to conduct restorations. For example, a restoration of a client may be conducted by applying a single backup image (e.g., synthetic full backup image) rather than multiple backup images (e.g., full backup and incremental backup images).

In an embodiment, the filesystem may be divided into logical partitions. These logical partitions may be referred to as MTrees. These are practically standalone filesystems inside a larger filesystem that encloses them. As many as 256 separate Mtrees can exist in each instance of a deduplication filesystem such as DDFS. An MTree is a set of files in a self-contained file set and each MTree can act as a mount point. Mtrees are represented internally as a B+ Tree. In other words, in an embodiment, an MTree's underlying data structure is a B+ Tree.

Figure 4:
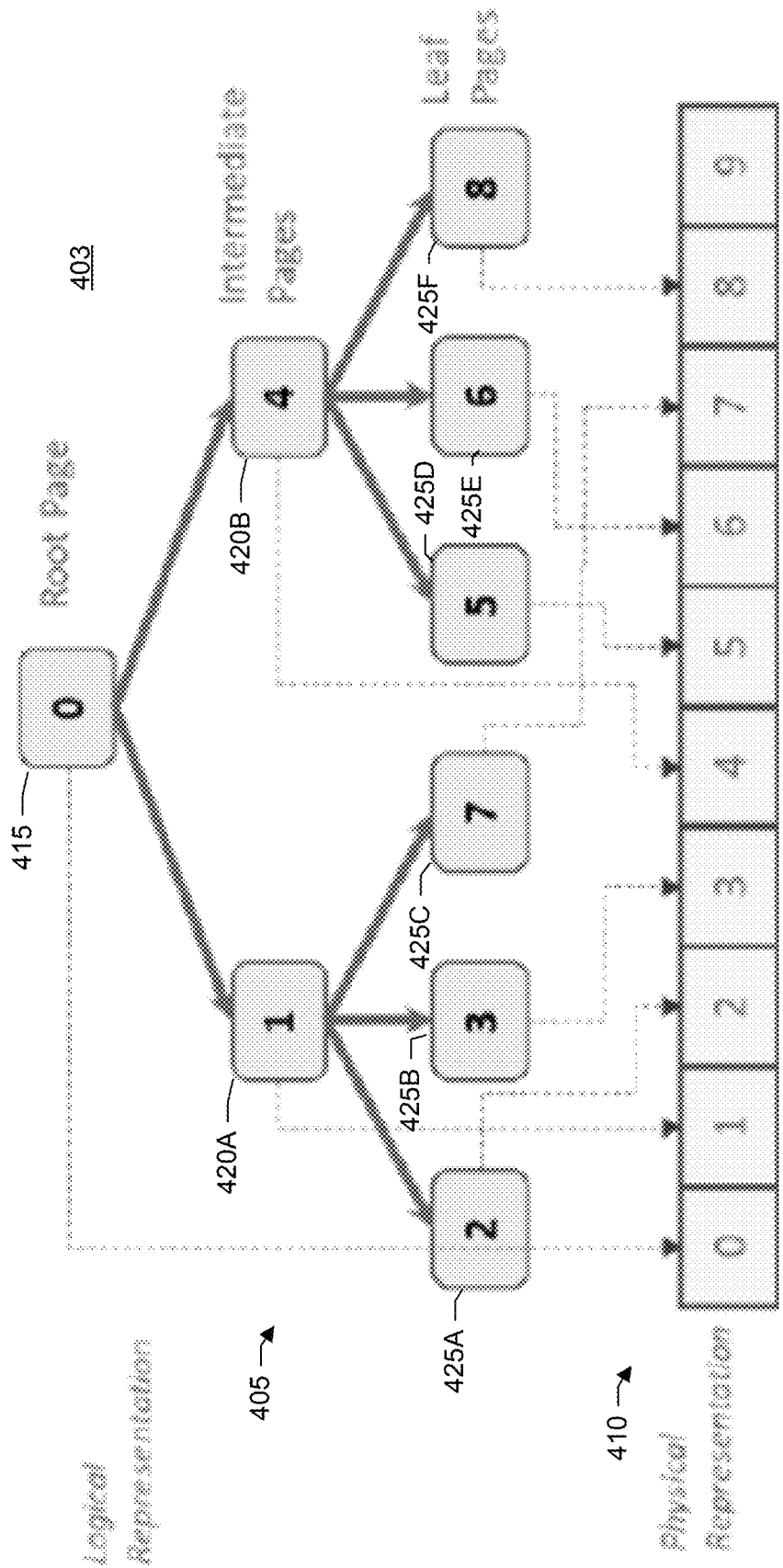
FIG. 4 shows a block diagram of a B+ Tree, according to one or more embodiments, according to one or more embodiments.

FIG. 4 shows an example of a B+ Tree 203. The tree may be used to hold a namespace of the filesystem. As discussed, the namespace provides a hierarchical organizational structure for identifying filesystem objects through a file path. In an embodiment, the namespace is held in a tree data structure and, more specifically, a B+ Tree. FIG. 4 shows an example of a B+ Tree 403 in a logical representation 405 and a physical representation 410. In this example, there is a root page 415, intermediate pages 420A,B, and leaf pages 425A-F. The broken lines shown in FIG. 4 map the pages from their logical representation in the tree to their physical representation as a linear sequential set of pages on disk, e.g., flattened on-disk layout. In other words, the tree may be represented as a line of pages of data. A physical walk thus involves linearly traversing the line of pages, page after page, in a sequential manner.

A B+ Tree is a self-balancing tree data structure that may be used for indexing and storing large amounts of data. In a B+ Tree, each page or node can have multiple children (e.g., dozens, hundreds, or even many thousands). In an embodiment, leaf pages of a B+ Tree contain an ordered listing of keys having corresponding values that are pointers to the actual data records, while the non-leaf pages (e.g., intermediate pages or pages at a level above the leaf pages) act as indexes or pointers to other nodes or pages. In other words, leaf pages are at a bottom-most level of the tree and contain or point to the actual data records using key-value pairs. Thus, filesystem metadata such as the names of files and their attributes may be stored in B+ Trees.

In an embodiment, the filesystem defines MTrees as logical partitions of the filesystem, and they are identified by unique names. MTrees are used to create logical storage units. The storage units may be referred to as DD Boost storage units. In an embodiment, a storage unit is an MTree configured for the DD Boost protocol. Data isolation is achieved by creating a storage unit and assigning it to a user. The user may be referred to as a DD Boost user. The DD Boost protocol permits access only to storage units assigned to DD Boost users connected to the system. The protocol is a proprietary protocol that provides, among other things, client-side deduplication. In an embodiment, the filesystem provides for fast copy functionality on these Mtrees, which can be used to clone files on the storage system (e.g., Data Domain system) to an alternate location within the local instance of the filesystem (e.g., Data Domain File System (DDFS)).

In an embodiment, each file in the filesystem is represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

Referring back now to FIG. 1, at the client, the backup utility being native to the application is thus built into the application itself rather than being an external tool or add-on. For example, the backup utility may be integrated into the codebase and user interface of the application. The backup utility can provide a user experience consistent with other modules of the application by following the same design principles, architecture, user interface conventions, and workflows as the other modules of the application. The backup utility may directly access the application's data, settings, and other resources without the need for intermediary layers or application programming interfaces (APIs), thereby resulting in good performance and a good user experience. Since the utility is part of the application's trusted codebase, the backup utility can benefit from the same security measures and policies applied to the application. Some examples of native backup utilities and their corresponding applications include Oracle Recovery Manager (RMAN) for Oracle databases as provided by Oracle Corporation of Austin, Texas, and SQL Server Backup for SQL Server as provided by Microsoft Corporation of Redmond, Washington, among others. These backup utilities are designed to work with the specific data formats of their corresponding applications and may offer features unique to their corresponding applications.

The filesystem plugin presents a standard filesystem mount point to the application. Mounting or attaching the deduplication filesystem of the backup storage system to the application provides the application with access to the files being managed by the filesystem. The client-side deduplication library exposes an API through which communications can be exchanged between the application and deduplication backup storage system. In an embodiment, the plugin includes a filesystem created in userspace via the FUSE framework. FUSE provides a bridge between the userspace filesystem plugin and a VFS layer in the Linux kernel. Since the FUSE library is incorporated into the Linux kernel code, no separate installation is needed. The plugin is written using a FUSE library and is not dependent on any SDK or application. The plugin provides a filesystem interface like a network drive and thus any application can be used on the mount point. The mount point provided by the filesystem plugin creates a local drive that can be provided as a destination for backup and data protection workflows configured from within the client application.

An example of a filesystem plugin includes BoostFS (Boost Filesystem) as provided by Dell Technologies. More particularly, direct access to the BoostFS mount point allows the application to leverage the storage and network efficiencies provided by the client-side deduplication library. An example of the client library included with BoostFS is Data Domain (DD) Boost. DD Boost includes a protocol that distributes parts of a deduplication process to the application clients, enabling client-side deduplication for faster, more efficient backup and recovery. In an embodiment, the clients use the DD Boost backup protocol to conduct backups of client data to the storage system, restore the backups from the storage system to the clients, request filesystem operations (e.g., file copy operations or synthetic backup operations), or perform other data protection operations.

The DD Boost library exposes application programming interfaces (APIs) to integrate with a Data Domain system using an optimized transport mechanism. These API interfaces exported by the DD Boost library provide mechanisms to access or manipulate the functionality of a Data Domain filesystem. Embodiments may utilize the DD Boost Filesystem Plug-In (BoostFS), which resides on the application system and presents a standard file system mount point to the application. A client may run any number of different types of protocols as the filesystem supports multiple network protocols for accessing remote centrally stored data (e.g., Network File System (NFS), Common Internet File System (CIFS), Server Message Block (SMB), and others). Some embodiments are described in conjunction with the DD Boost protocol, Data Domain Restorer (DDR) storage system, and Data Domain filesystem as provided by Dell Technologies. It should be appreciated, however, that principles and aspects discussed can be applied to other filesystems, filesystem protocols, and backup storage systems.

The client includes a hardware platform including memory, processor, and other computing components. Memory of the client may be divided into a kernel space 163 and userspace 166. Virtual memory may be used to provide the separate address spaces for the userspace and kernel space. Kernel space is the region where an operating system (OS) kernel 169 executes and provides its services to requesting applications and programs in userspace. The kernel has full access to the hardware and is responsible for managing system resources, such as CPU, memory, and I/O devices. The kernel runs in a privileged mode (supervisor mode), meaning it can execute any CPU instruction and access any memory address. The kernel operates with the highest level of privilege. This means it can perform operations that userspace programs cannot, such as directly interacting with hardware and managing system resources. The separation of kernel space from userspace helps protect the system from erroneous or malicious programs. Userspace programs are blocked from directly accessing kernel space. Instead, access to the kernel is provided through defined system calls. System calls are controlled entry points through which a userspace application requests services from the kernel. Examples include file operations (open, read, write), process control (fork, exec), and network operations.

In an embodiment, the operating system includes a Linux OS. A virtual filesystem (VFS) 172 is an abstraction layer within the Linux kernel. VFS provides a single API for system calls related to file operations, such as open, read, write, and close, regardless of the underlying file system type. Through VFS, Linux can support various filesystems such as ext4, XFS, Btrfs, NTFS, FAT32 and network file systems such as NFS or CIFS. When an application performs a file operation (e.g., opening a file), the system call is handled by the VFS layer. Processing performed by VFS may include pathname resolution, identification of responsible filesystem, and return of results to requesting application.

Filesystem in Userspace (FUSE) 175 is a framework that allows the creation of filesystems in userspace rather than kernel space. FUSE provides a bridge between userspace filesystems and the VFS layer in the kernel. Components of FUSE include the FUSE userspace library (libfuse) which assists in creating userspace filesystems by providing an API for userspace programs.

In an embodiment, the application running in userspace on the client computer system accesses a mounted filesystem to perform file operations such as create, read, and write. In an embodiment, the mounted filesystem is a BoostFS userspace filesystem. The application makes operating system calls to the client kernel virtual filesystem module which passes the operations through a kernel filesystem callback module to the appropriate handler or driver, such as the BoostFS process in userspace. In an embodiment, the BoostFS process includes the client-side deduplication library (e.g., DDBoost API library) which communicates with the backup storage system (e.g., DDR server). Standard filesystem requests are routed through the filesystem plugin (e.g., BoostFS) and eventually processed through the client-side duplication library (e.g., DD Boost library).

An example of a system call in the FUSE library is "copy_file_range." This system call allows for efficient copying of data between two file descriptors. A file descriptor is a low-level identifier used by the operating system to uniquely identify an open file within a process. When a file is opened, the operating system assigns a file descriptor to it. This descriptor is used to reference the file in subsequent system calls (e.g., read, write, close). File descriptors are used by the operating system to perform various I/O operations such as reading from a file, writing to a file, and closing a file.

The copy_file_range( ) system call performs an in-kernel copy between two file descriptors without the additional cost of transferring data from the kernel to userspace (e.g., glibc) and then back into the kernel. It copies up to "len" bytes of data from the source file descriptor "fd_in" to the target file descriptor "fd_out," overwriting any data that exists within the requested range of the target file.

Specifically, parameters of the copy file range system call include fd_in, off_in, fd_out, off_out, and len. The parameter "fd_in" identifies the file descriptor of the source file. The parameter "off_in" is a pointer to the offset in the source file where the copy should start. The parameter "fd_out" is the file descriptor of the destination file. The parameter "off_out" is a pointer to the offset in the destination file where the copy should start. The parameter "len" is the number of bytes to copy.

Userspace is the region where application software runs. This includes everything from system utilities and applications to user processes. Userspace operates in an unprivileged mode (user mode), meaning it has restricted access to system resources and must use system calls to request services from the kernel.

In an embodiment, the filesystem plugin (e.g., BoostFS) is a userspace filesystem developed on top of FUSE and it uses the native FUSE library available on the system. This allows the FUSE client to mount the storage units (e.g., DD Boost storage units) exported by the filesystem (e.g., Data Domain).

Synthetic backup and fast copy operations offer multiple advantages to the applications and administrators in terms of reduced backup window and reduced or minimized impact on production systems. Such operations also help in faster backup replication restores. For example, synthetic full backups reduce the need to maintain intermediate incremental backups and their versions. Further, metadata centric operations can increase storage efficiency and bandwidth optimization, provide easier migration to new storage, and facilitate content distribution and disk cloning.

It is desirable for the application to be able to conduct a fast copy operation and synthetic backup operation without using any SDK or third-party application/library. SDKs can require partnerships with the backup software and can be time-consuming. Use of third-party applications increase the cost to the customer due to licensing terms. Application workflows may be impacted when having to rely on the backup terms and processes of the backup software. Finally, native backup methods cannot be supported using SDKs or third-party application/libraries.

As discussed, BoostFS is a filesystem interface developed using DDBoost APIs (Application Program Interfaces). Applications can use native backup and restore methods using the BoostFS mount point. It is supported on Linux operating systems using the native FUSE library. It can be treated as substitution technology for NFS workloads and expands the benefits of DD Boost to applications which are not integrated with DD Boost SDK.

In an embodiment, systems and techniques implement the FUSE callback mechanism to trigger fast copy and synthetic backup operations for the general file system workflows. With the recent advancement in the FUSE library (e.g., FUSE 3.0 and above) that is natively available with the latest Linux kernel, a new set of FUSE operations are introduced such as the "copy_file_range( )" operation which performs an optimized copy between two file descriptors without the additional cost of transferring data through the FUSE kernel module to user space (Glibc) and then back into the FUSE filesystem again.

In an embodiment, when an application triggers the copy operation on the BoostFS mount point, it calls the FUSE: copy_file_range( ) and it invokes fast copy APIs through BoostFS handler routine for copy_file_range( ) operation. Using the FUSE:copy_file_range( ) operation on the BoostFS mount point, the application can leverage the fast copy and synthetic backup features for improved or optimized performance.

Figure 5:
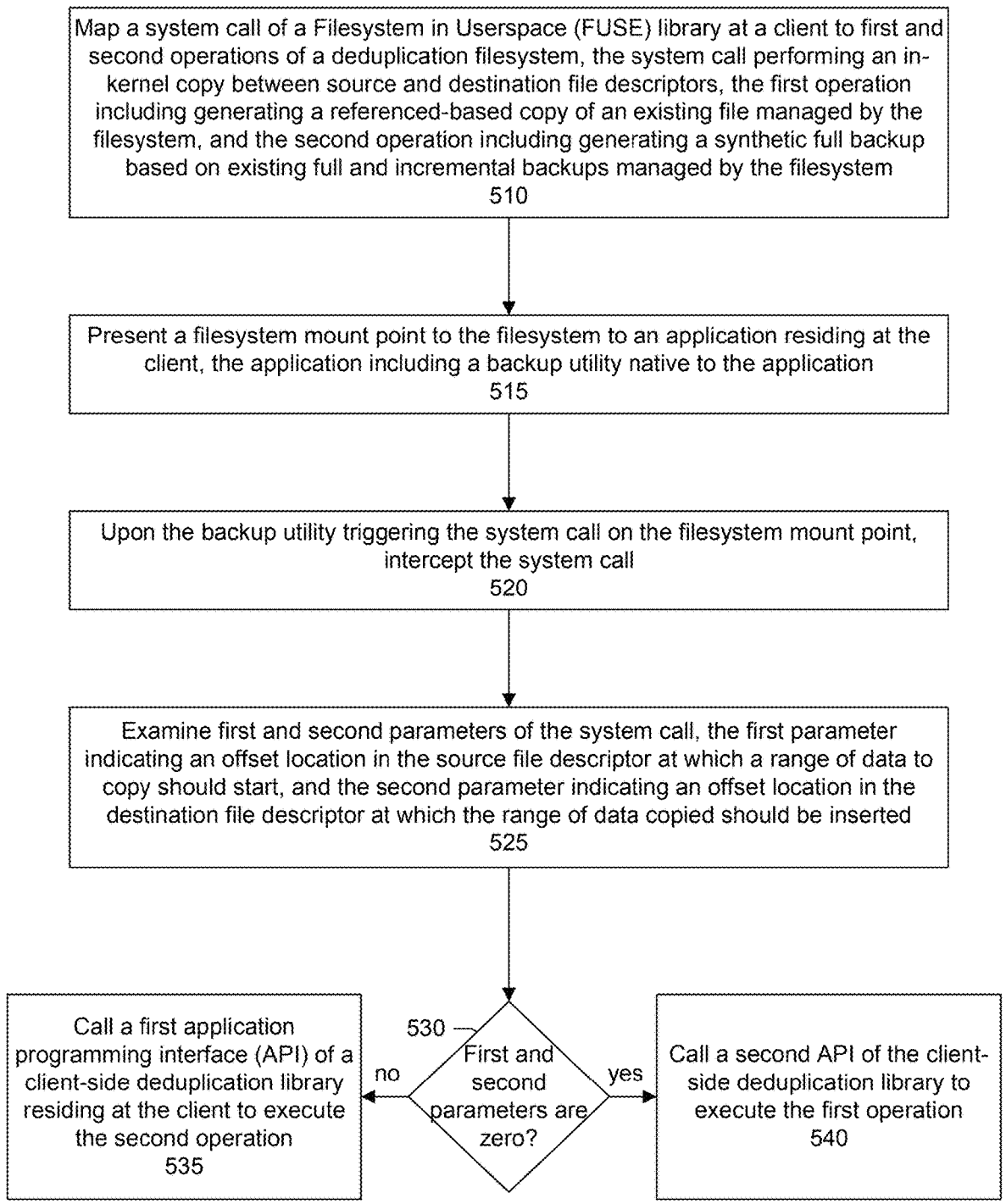
FIG. 5 shows a flow for providing operations of a deduplication filesystem to a backup utility native to an application, according to one or more embodiments.

FIG. 5 shows a flow for providing fast copy and synthetic backup operations to a backup utility native to an application. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a system call of a FUSE library at a client is mapped to first and second operations of a deduplication filesystem. The system call performs an in-kernel copy between source and destination file descriptors. The first operation includes generating a referenced-based copy or fast copy of an existing file managed by the filesystem. The second operation includes generating a synthetic full backup based on existing full and incremental backups managed by the filesystem.

Figure 6:
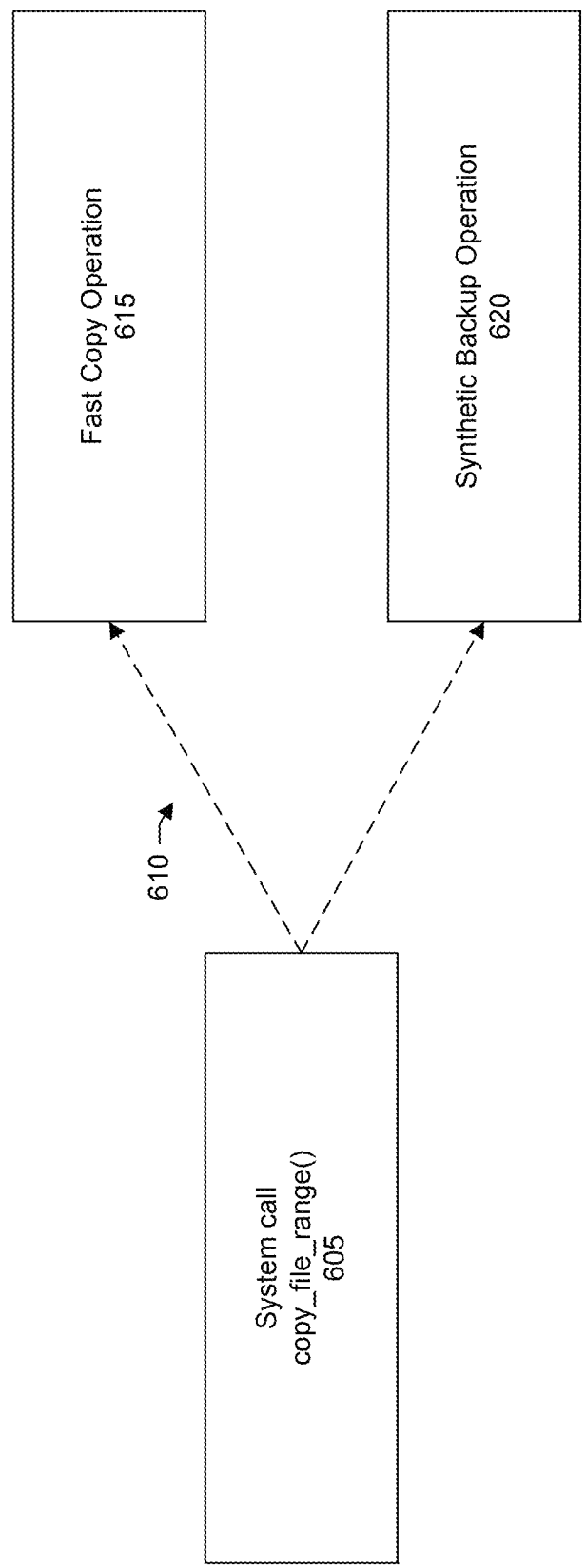
FIG. 6 shows an example of a system call being mapped to two different operations of a deduplication filesystem, according to one or more embodiments.

FIG. 6 shows a block diagram of the mapping. As shown in the example of FIG. 6, a FUSE operation or system call copy_file_range 605 is redirected, diverted, or translated 610 to one of a fast copy operation 615 or synthetic backup operation 620 to be handled by the client-side deduplication library and respective APIs (e.g., Boost APIs). The client-side deduplication library, in turn, issues a remote procedure call (RPC) to the data protection backup server to fulfill the request. When the application triggers the copy_file_range system call on the particular mount point provided by the filesystem plugin (e.g., BoostFS mount point), the call is handled by a particular FUSE API which, in turn, invokes a corresponding API of the filesystem plugin through a handler routine.

More particularly, referring back now to FIG. 5, in a step 515, a mount point of the filesystem is presented to an application residing at the client. The application includes a backup utility native to the application.

In a step 520, upon the backup utility triggering the system call on the filesystem mount point, the system call is intercepted.

In a step 525, first and second parameters of the system call are examined. The first parameter indicates an offset location in the source file descriptor at which a range of data to copy should start. The second parameter indicates an offset location in the destination file descriptor at which the range of data copied should be inserted.

In a step 530, a determination is made as to whether the first and second parameters are zero. When the first and second parameters are not zero, a first API of the client-side deduplication library residing at the client is called to execute the second operation, e.g., synthetic backup (step 535). When the first and second parameters are zero, a second API of the client-side deduplication library is called to execute the first operation, e.g., fast copy.

The fast copy and synthetic backup operations can be accessed by the backup utility native to the application being backed up. This allows a user of the application the flexibility to create workflows, workloads, and schedules, within the application itself, for executing the fast copy and synthetic backup operations.

For example, a user of the application may use the backup utility within the application itself to create a backup schedule that specifies weekly synthetics. A backup cycle may be specified as having a full backup at a beginning of a week, followed by incremental backups throughout the week, and generation of a synthetic backup at an end of the week based on the full and incremental backups. Generating the synthetic backup does not impose a load on the client or network because the operation is handled by the data protection backup server. Thus, the resources of the client can remain dedicated to servicing production requests. As another example, the user of the application may use the backup utility within the application itself to conduct referenced-based or fast copy operations such as for purposes of replication, cloning, or disaster recovery.

These operations can be configured by the user from within the application being backed up. Thus, the user can configure the data protection backup operations, including backup and restoration policies, using an interface that they have familiarity with. The resulting backups or data sets resulting from the operations can be managed from within the application itself and using metadata generated by the application itself, thereby providing a seamless and consistent user experience with other modules and features of the application. The user does not have to rely on and maintain third-party backup software which may have its own separate interface and generate its own metadata through which the backups are managed.

Figure 7:
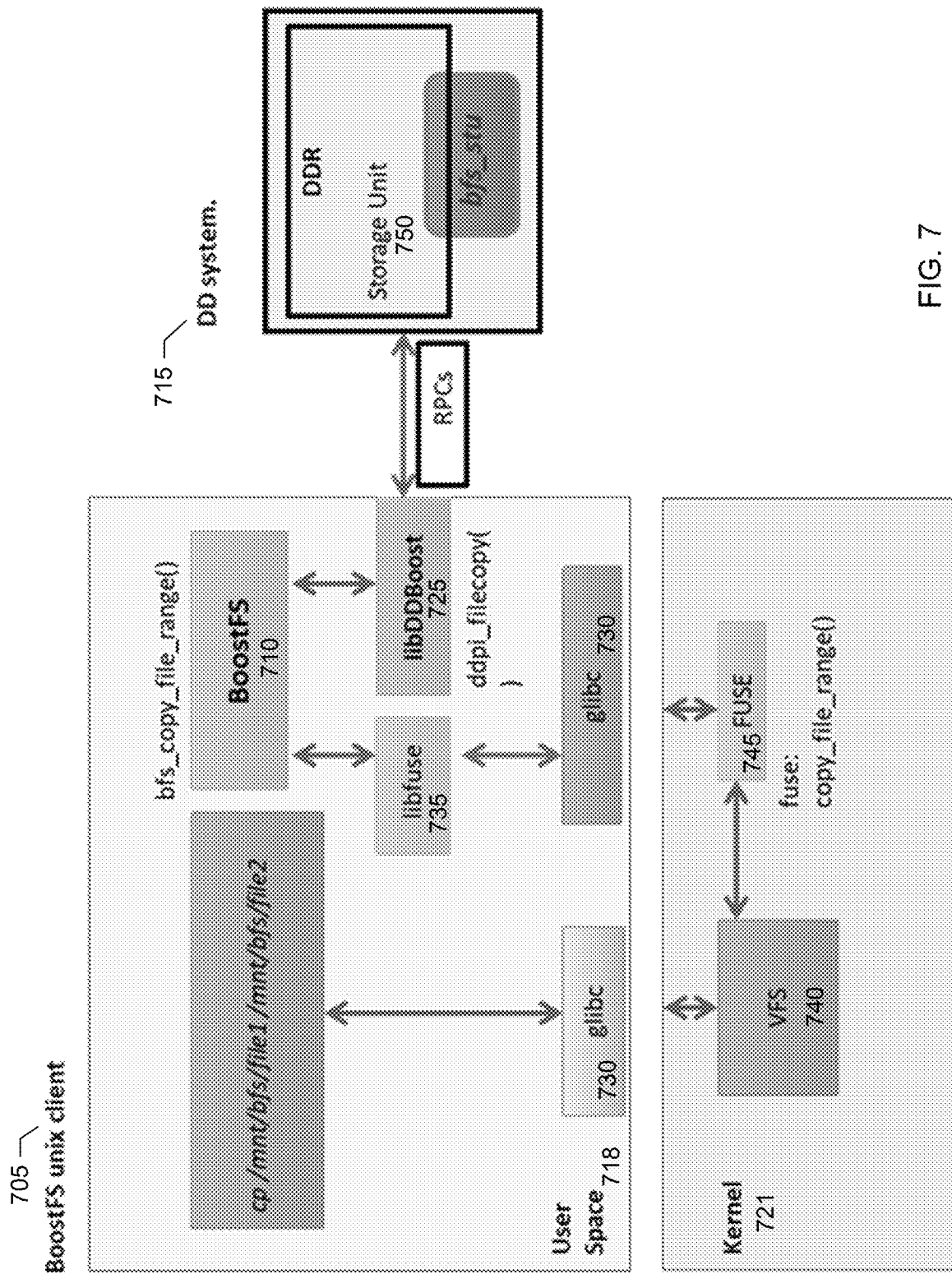
FIG. 7 shows a more detailed block diagram of an interface between a client and data protection backup storage system, according to one or more embodiments.

FIG. 7 shows a more detailed block diagram of the interface between a client 705 running a filesystem plugin 710 and a data protection backup system 715. Memory areas of the client include a user space 718 and a kernel space 721. In the example shown in FIG. 7, the filesystem plugin is BoostFS and the data protection backup system includes a Data Domain Restorer (DDR). The client may be referred to as a BoostFS Unix client as the BoostFS filesystem plugin has been installed on the client. The BoostFS filesystem plugin interacts with a client-side library 725 that may be referred to as libDDBoost which is installed at the client as part of the filesystem plugin.

The userspace includes libraries glibc 730 and libfuse 735. These libraries are userspace components and available in a Unix system by default. The kernel level components include virtual filesystem (VFS) 740 and FUSE 745. The data protection backup system holds the data on a storage unit 750. The filesystem plugin translates filesystem calls received in FUSE to corresponding client-side library APIs, e.g., Boost APIs.

As shown in the example of FIG. 7, the BoostFS unix client has mounted the BoostFS on the mount point "/mnt/bfs." A storage unit identified as "bfs_stu" is mounted on this client as mount path "/mnt/bfs." The client application accessing the BoostFS mount point has invoked the "copy_file_range( )" operation on the file stored on BoostFS storage unit.

At the kernel level, the Virtual File System interface has invoked the corresponding FUSE operation for copy_file_range( ). The VFS layer identifies the mount point as a FUSE-based file system and translates the call to the corresponding FUSE handler. When the BoostFS is mounted, the callbacks are registered for the BoostFS operation with the corresponding FUSE operation. So, the BoostFS operation for copy_file_range is invoked in the userspace. That is, the FUSE copy_file_range operation is mapped to the filesystem plugin or BoostFS copy_file_range operation, e.g., "bfs_copy_file_range( )." The BoostFS implementation calls the corresponding DDBoost APIs for the fast copy operation or synthetic backup operation depending on the workflow.

Figure 8:
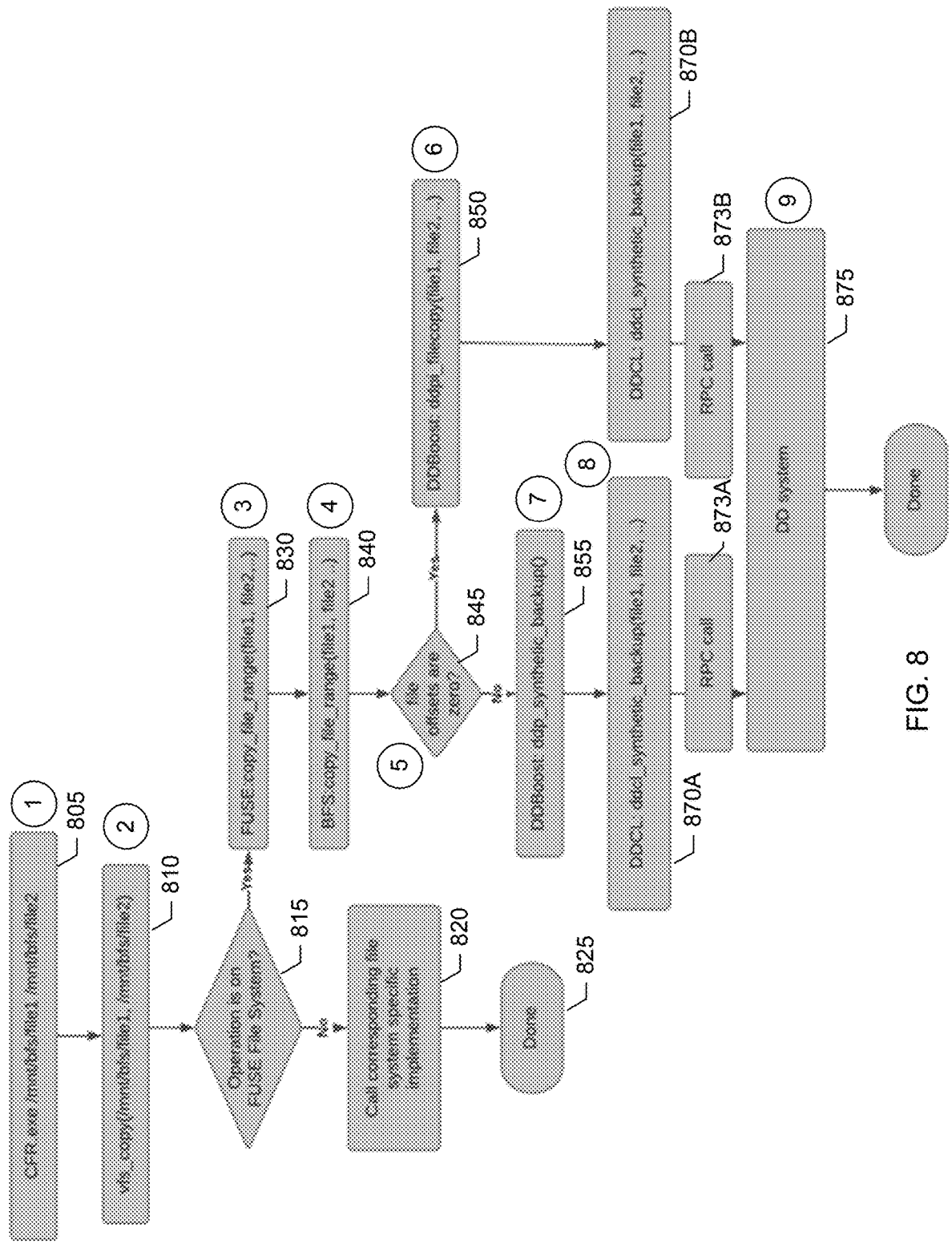
FIG. 8 shows a flow of the interface shown in FIG. 7, according to one or more embodiments.

FIG. 8 shows a workflow for the synthetic backup and fast copy operations, according to one or more embodiments. In a first step 805, CFR is the application CLI which seeks to perform a fast copy operation for a source file "/mnt/bfs/file1" to destination file "/mnt/bfs/file2." The files may represent two different logical partitions or Mtrees.

In a second step 810, on the BoostFS Linux clients, the VFS (Virtual File System) intercepts this call to process further through the glibc userspace component. In a step 815, a determination is made as to whether the operation is on the FUSE filesystem. If the operation is not on the FUSE filesystem (e.g., EXT filesystem), a call is made to the corresponding filesystem specific implementation (step 820) and the workflow ends (step 825).

If, however, in a third step 830, the source and destination file belong to the FUSE based filesystem (BoostFS in this case), the corresponding FUSE operation is invoked e.g., FUSE:copy_file_range( ). In a fourth step 840, since the file belongs to DDBoost file system mount points, the corresponding BoostFS (BFS) implementation of this operation is invoked, e.g., BFS:copy_file_range( ). These callbacks are registered as part of the filesystem plugin installation.

In a fifth step 845, a determination is made as to whether the file offsets in the copy file range operation are zero. In a sixth step 850, if the file offsets for source file and destination file are detected as zero, then a file or fast copy operation is executed. However, in a seventh step 855 if the file offsets for the source file and destination file are not zero, a synthetic file copy operation executed.

Specifically, if the offsets specified for the source file and destination file are starting from zero, execute corresponding DDBoost client level API (ddpi_filecopy) to perform the fast copy operation between two files or Mtrees.

Else, if the offsets specified for the source file and destination file are not zero, execute corresponding DDBoost client level API (ddp_synthetic_backup) to perform the synthetic backup operation between the source and destination files.

More particularly, in an eighth step 870A or 870B, accordingly, the DDBoost client API implementation invokes the Data Domain Client Library API (ddcl_*) which performs an RPC call 873A, 873B to the data protection backup storage system (e.g., DD system). Prior to making the RPC call, the client library may conduct further processing such as client-side deduplication or distributed segment processing, data encryption, compression, other intermediary operations, or combinations of these. In a ninth step 875, the data protection backup server (e.g., DD server) executes the required file copy or synthetic backup operation and the result is returned to the application. Thus, the offsets specified in the copy_file_range call are used to determine which operation to execute. Copy operations of the application are translated into fast copy or synthetic backup operations transparently and without requiring an SDK integration. In particular, the copy_file_range call includes the parameters for handling the fast copy and synthetic backup operations. Thus, the user does not have to modify their workflows or supply any extra parameter, data, or other input outside of specifying the parameters for the copy_file_range call.

In an embodiment, a method includes upon mounting a filesystem via a filesystem plugin residing at a client, registering a callback for a copy file range operation of the filesystem plugin with a corresponding copy file range operation of a Filesystem in Userspace (FUSE) library; upon the FUSE copy file range operation being invoked, invoking the copy file range operation of the filesystem plugin; checking file offset parameters specified in the copy file range operation of the filesystem plugin; when the file offset parameters are zero, calling an application programming interface (API) of a client-side library to perform a fast copy operation between a source file and a destination file specified in the copy file range operation of the filesystem plugin, the API call resulting in a remote procedure call (RPC) to a storage system connected to the client that instructs the storage system to execute the fast copy operation; and when the file offset parameters are not zero, calling another API of the client-side library to perform a synthetic backup operation between the source file and the destination file, the other API call resulting in another RPC to the storage system connected to the client that instructs the storage system to execute the synthetic backup operation.

In an embodiment, systems and techniques provide for redirecting copy_file_range( ) calls in FUSE to file copy calls and synthetic backup calls through a filesystem plugin residing at the client. A client application's copy operations are translated into fast copy and synthetic backup operations, transparently, to achieve improved performance without the need to use any SDK integration or third party library. Seamless integration with applications for the native backup and restores workflows provide an improved user experience and features that may be available with the native backup utility of the application. The applications need not rely on the controller software for backup and restore workflows. Any application running on the client system is able to use the fast copy and synthetic backup features offered by the data protection backup storage system. These operations can facilitate dynamic storage tiering and adaptive resource scaling. The storage exported by the backup storage system (e.g., DD system) via the filesystem plugin (e.g., Boost File System) can be used dynamically as per the workloads. Such systems and techniques can further facilitate enhanced security and compliance controls and decouples storage logic from application logic.

To prove operability, a proof of concept was constructed according to the flow shown in Table A below.

TABLE A

| Step | Description/command |
| --- | --- |
| 1 | Install BoostFS package on a Unix based system, e.g., Ubuntu-20.04:<br>root@ubuntu2004: ~# dpkg -i DDBoostFS_7.11.0.0_000000_amd64.deb |
| 2 | Setup the RSA lockbox authentication mechanism for the given storage unit and its user on the DD system:<br>root@ubuntu2004: ~# boostfs lockbox set -d 10.227.40.246 -u sysadmin -s a1 |
| 3 | Mount the BoostFS file system:<br>root@ubuntu2004: ~#/opt/emc/boostfs/bin/boostfs mount -d 10.227.40.246 -s a1 -o log-level=debug -o allow-others=true /mnt/bfs |
| 4 | Perform the copy operation on files within BoostFS mount point. The command below uses the copy.out program which exercises the copy_file_range method for copying the source file into the destination file:<br>root@ubuntu2004: ~#./copy.out /mnt/bfs/test_ddp_set_retention_time_ext file 2 /mnt/bfs/copyfile2 |

Table B shows the corresponding BoostFS log snippets.

TABLE B

Destination file created
------------------------
Oct 9 07:30:14.608 206576 3347048192 [I] bfs getattr: /copyfile2 - nothing matched
Oct 9 07:30:14.608 206576 3347048192 [P] BFSPROC_EXIT_bfs_getattr: rc =−2
Oct 9 07:30:14.608 206576 3445868288 [P] BESPROC_ENTER_bfs_create: path=/copyfile2 mode=0100644
Oct 9 07:30:14.608 206576 3445868288 [P] BFSPROC_ENTER_bfs_create: path=/copyfile2 mode=0100644
Oct 9 07:30:15.452 206576 3445868288 [I] [ddp log] [326F0: 7F22C8006C80] ddp_open_file_ext ( ) success for File: a1//copyfile2
Oct 9 07:30:15.452 206576 3445868288 [I] [ddp log] [326F0: 7F22C8006C80] creating async pool of size 2 for file with dfd 1
Oct 9 07:30:15.452 206576 3445868288 [P] BFSPROC_EXIT_bfs_create: rc=0
Oct 9 07:30:15.452 206576 3445868288 [P] BESPROC_ENTER_bfs_fgetattr: path=/copyfile2
Oct 9 07:30:15.452 206576 3445868288 [P] BESPROC_ENTER_bfs getattr: path=/copyfile2
Oct 9 07:30:15.452 206576 3445868288 [D] bfs_node_lookup: path=/copyfile2 connd=0x7f22cd63badc conn type=0

TABLE B-continued

Oct 9 07:30:15.452 206576 3445868288 [D] bis node_find: list-count=1 for list-name=node-list-040
Oct 9 07:30:15.452 206576 3445868288 [D] bfs_node_lookup: returning node=0x7f22b0007eb0 id=4 list=node-list-040 connd=0xb502d003 for file=/copyfile2 (nodes=1)
Oct 9 07:30:15.661 206576 3445868288 [P] BESPROC_EXIT_bfs_getattr: rc=0
Oct 9 07:30:15.661 206576 3445868288 [P] BESPROC_EXIT_bfs_fgetattr: rc=0
Source file read
----------------
Oct 9 07:30:15.662 206576 3300886272 [D] BESPROC_ENTER_bfs_read: path=/test_ddp_set_retention_time_ext_file_1 size=65536 offset=0 flags=0x00008000
.
Oct 9 07:30:16.504 206576 3300886272 [D] BFSPROC_EXIT_bfs_read: rc=65536
.
.
Copy operation started
----------------------
Oct 9 07:30:16.504 206576 3437336320 [D] BESPROC_EXIT_bfs_copyfilerange: rc=0
destination file closed
-----------------------
Oct 9 07:30:16.504 206576 3445868288 [P] BFSPROC_ENTER_bfs_flush: path=/copyfile2

TABLE B-continued

Oct 9 07:30:16.504 206576 3445868288 [P] BESPROC_EXIT_bfs_flush: rc=0

As shown in the log entry "Oct 9 07:30:16.504 206576 3437336320 [ID] BFSPROC_EXIT_bfs_copy_fle_range: rc=0," the BoostFS logs show success in registering a BoostFS callback for FUSE:copy_file_range( ) operation. Upon invocation of this FUSE operation from the user space program, the program is reaching the BoostFS implementation of this callback function.

In an embodiment, a method includes mapping a system call of a Filesystem in Userspace (FUSE) library at a client to first and second operations of a deduplication filesystem, the system call performing an in-kernel copy between source and destination file descriptors; presenting a filesystem mount point of the deduplication filesystem to an application residing at the client; upon the application triggering the system call on the filesystem mount point, intercepting the system call; examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and based on the examination of the first and second parameters, calling one of a first application programming interface (API) of a client-side deduplication library residing at the client to execute the first operation, or a second API of the client-side deduplication library to execute the second operation.

In an embodiment, the application includes a backup utility that triggers the system call, the backup utility being native to the application. In an embodiment, the method further includes when the first and second parameters are zero, calling the first API to execute the first operation. In an embodiment, the method further includes when the first and second parameters are not zero, calling the second API to execute the second operation.

The first operation may include copying a file managed by the deduplication filesystem by cloning metadata of the file, but not content of the file. The second operation may include generating a full backup based on existing full and incremental backups managed by the deduplication filesystem. In an embodiment, the system call comprises a copy_file_range system call.

In another embodiment, there is a system comprising: a processor; and memory configured to store one or more sequences of instructions which, when executed by the processor, cause the processor to carry out the steps of: mapping a system call of a Filesystem in Userspace (FUSE) library at a client to first and second operations of a deduplication filesystem, the system call performing an in-kernel copy between source and destination file descriptors; presenting a filesystem mount point of the deduplication filesystem to an application residing at the client; upon the application triggering the system call on the filesystem mount point, intercepting the system call; examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and based on the examination of the first and second parameters, calling one of a first application programming interface (API) of a client-side deduplication library residing at the client to execute the first operation, or a second API of the client-side deduplication library to execute the second operation.

In another embodiment, there is a computer program product, comprising a non-transitory computer-readable medium having a computer-readable program code embodied therein, the computer-readable program code adapted to be executed by one or more processors to implement a method comprising: mapping a system call of a Filesystem in Userspace (FUSE) library at a client to first and second operations of a deduplication filesystem, the system call performing an in-kernel copy between source and destination file descriptors; presenting a filesystem mount point of the deduplication filesystem to an application residing at the client; upon the application triggering the system call on the filesystem mount point, intercepting the system call; examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and based on the examination of the first and second parameters, calling one of a first application programming interface (API) of a client-side deduplication library residing at the client to execute the first operation, or a second API of the client-side deduplication library to execute the second operation.

In another embodiment, there is a method comprising: mapping a system call of a Filesystem in Userspace (FUSE) library at a client to first and second operations of a deduplication filesystem, the system call performing an in-kernel copy between source and destination file descriptors, the first operation comprising cloning metadata of an existing file managed by the deduplication filesystem, and the second operation comprising generating a synthetic full backup based on a full backup and incremental backup managed by the deduplication filesystem; presenting a filesystem mount point of the deduplication filesystem to an application residing at a client, the application comprising a backup utility, native to the application; upon the backup utility of the application triggering the system call on the filesystem mount point, intercepting the system call; examining first and second parameters of the system call, the first parameter indicating an offset location in the source file descriptor at which a range of data to copy should start, and the second parameter indicating an offset location in the destination file descriptor at which the range of data copied from the source file descriptor should be inserted; when the first and second parameters are zero, calling a first application programming interface (API) of a client-side deduplication library residing at the client to execute the first operation in conjunction with the deduplication filesystem; and when the first and second parameters are not zero, calling a second API of the client-side deduplication library residing at the client to execute the second operation in conjunction with the deduplication filesystem.

Referring back now to FIG. 1, the clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system connected to the data protection server may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 9:
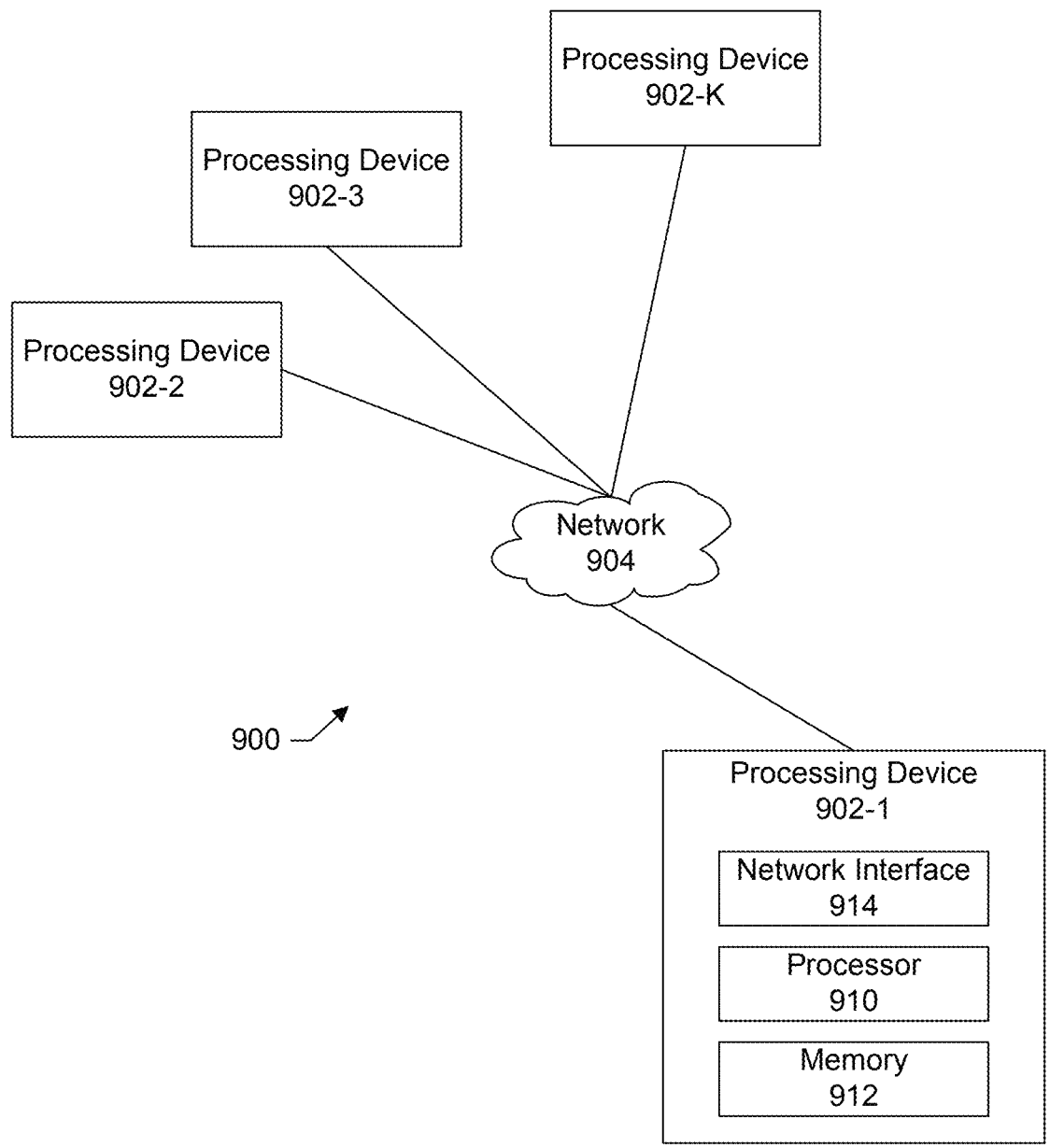
FIG. 9 shows a block diagram of a processing platform that may be utilized to implement at least a portion of an information processing system, according to one or more embodiments.

FIG. 9 shows an example of a processing platform 900 that may include at least a portion of the information handling system shown in FIG. 1. The example shown in FIG. 9 includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
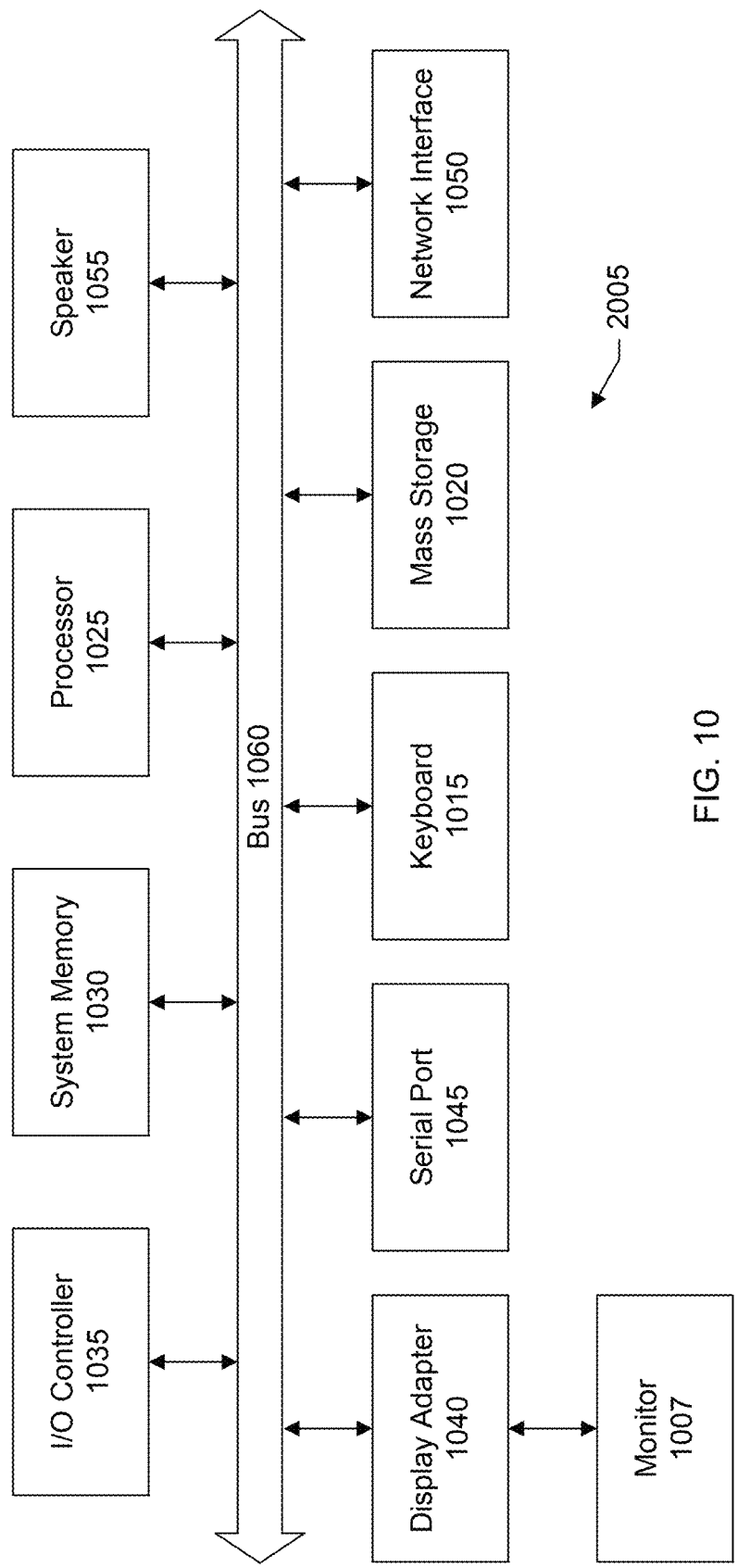
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
mapping a system call of a Filesystem in Userspace (FUSE) library at a client to first and second operations of a deduplication filesystem, the system call performing an in-kernel copy between source and destination file descriptors;
presenting a filesystem mount point of the deduplication filesystem to an application residing at the client;
upon the application triggering the system call on the filesystem mount point, intercepting the system call;
examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and
based on the examination of the first and second parameters, calling one of a first application programming interface (API) of a client-side deduplication library residing at the client to execute the first operation, or a second API of the client-side deduplication library to execute the second operation, wherein the first operation comprises copying a file managed by the deduplication filesystem by cloning metadata of the file, but not content of the file, and wherein the second operation comprises generating a full backup based on existing full and incremental backups managed by the deduplication filesystem.

2. The method of claim 1 wherein the application comprises a backup utility that triggers the system call, the backup utility being native to the application.

3. The method of claim 1 further comprising when the first and second parameters are zero, calling the first API to execute the first operation.

4. The method of claim 1 further comprising when the first and second parameters are not zero, calling the second API to execute the second operation.

5. The method of claim 1 wherein the system call comprises a copy_file_range system call.

6. A system comprising: a processor; and memory configured to store one or more sequences of instructions which, when executed by the processor, cause the processor to carry out the steps of:
mapping a system call of a Filesystem in Userspace (FUSE) library at a client to first and second operations of a deduplication filesystem, the system call performing an in-kernel copy between source and destination file descriptors;
presenting a filesystem mount point of the deduplication filesystem to an application residing at the client;
upon the application triggering the system call on the filesystem mount point, intercepting the system call;
examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and
based on the examination of the first and second parameters, calling one of a first application programming interface (API) of a client-side deduplication library residing at the client to execute the first operation, or a second API of the client-side deduplication library to execute the second operation, wherein the first operation comprises copying a file managed by the deduplication filesystem by cloning metadata of the file, but not content of the file, and wherein the second operation comprises generating a full backup based on existing full and incremental backups managed by the deduplication filesystem.

7. The system of claim 6 wherein the application comprises a backup utility that triggers the system call, the backup utility being native to the application.

8. The system of claim 6 wherein the processor further carries out the step of when the first and second parameters are zero, calling the first API to execute the first operation.

9. The system of claim 6 wherein the processor further carries out the step of when the first and second parameters are not zero, calling the second API to execute the second operation.

10. The system of claim 6 wherein the system call comprises a copy_file_range system call.

11. A computer program product, comprising a non-transitory computer-readable medium having a computer-readable program code embodied therein, the computer-readable program code adapted to be executed by one or more processors to implement a method comprising:
mapping a system call of a Filesystem in Userspace (FUSE) library at a client to first and second operations of a deduplication filesystem, the system call performing an in-kernel copy between source and destination file descriptors;
presenting a filesystem mount point of the deduplication filesystem to an application residing at the client;
upon the application triggering the system call on the filesystem mount point, intercepting the system call;
examining first and second parameters of the system call, the first parameter indicating an offset location in the source file descriptor at which a range of data to copy should start, and the second parameter indicating an offset location in the destination file descriptor at which the range of data copied from the source file descriptor should be inserted; and
based on the examination of the first and second parameters, calling one of a first application programming interface (API) of a client-side deduplication library residing at the client to execute the first operation, or a second API of the client-side deduplication library to execute the second operation, wherein the first operation comprises copying a file managed by the deduplication filesystem by cloning metadata of the file, but not content of the file, and wherein the second operation comprises generating a full backup based on existing full and incremental backups managed by the deduplication filesystem.

12. The computer program product of claim 11 wherein the application comprises a backup utility that triggers the system call, the backup utility being native to the application.

13. The computer program product of claim 11 wherein the method further comprises when the first and second parameters are zero, calling the first API to execute the first operation.

14. The computer program product of claim 11 wherein the method further comprises when the first and second parameters are not zero, calling the second API to execute the second operation.

15. The computer program product of claim 11 wherein the system call comprises a copy_file_range system call.

* * * * *